United States Patent [19]

Matsumoto

[11] Patent Number: 4,788,709
[45] Date of Patent: Nov. 29, 1988

[54] FACSIMILE COMMUNICATION TERMINAL WITH MEMO PATTERN MEMORY

[75] Inventor: Koichi Matsumoto, Tokyo, Japan

[73] Assignee: Canon Kabushiki Kaisha, Tokyo, Japan

[21] Appl. No.: 901,058

[22] Filed: Aug. 26, 1986

[30] Foreign Application Priority Data

Sep. 3, 1985 [JP] Japan .................. 60-193125

[51] Int. Cl.⁴ .............. H04M 11/00; H04N 1/00
[52] U.S. Cl. .................. 379/100; 358/256
[58] Field of Search ............ 358/256, 257; 379/100, 379/93

[56] References Cited

U.S. PATENT DOCUMENTS

| 4,231,069 | 10/1980 | Wellendorf et al. | 358/256 |
| 4,255,766 | 3/1981 | Matsuda et al. | 358/257 |
| 4,310,859 | 1/1982 | Takahashi et al. | 358/256 |
| 4,321,626 | 3/1982 | Wada | 358/100 X |
| 4,494,149 | 1/1985 | Furukawa | 358/257 |
| 4,567,322 | 1/1986 | Tsuda | 358/256 |
| 4,581,656 | 4/1986 | Wada | 358/257 |
| 4,694,352 | 9/1987 | Ina et al. | 379/100 X |

FOREIGN PATENT DOCUMENTS

| 0073510 | 6/1979 | Japan | 358/257 |
| 0013557 | 1/1980 | Japan | 358/257 |
| 0046604 | 4/1980 | Japan | 358/257 |
| 0086262 | 6/1980 | Japan | 358/257 |
| 58-31659 | 2/1983 | Japan | 358/256 |
| 0134552 | 7/1985 | Japan | 358/256 |

Primary Examiner—Keith E. George
Attorney, Agent, or Firm—Fitzpatrick, Cella, Harper & Scinto

[57] ABSTRACT

A communication terminal apparatus such as a facsimile apparatus used together with a telephone set has a recording device to record data which is received through a telephone line on a recording paper; a memory to store a pattern; an indicating device to instruct the recording device to record; and a control unit to read out the pattern from the memory in accordance with a predetermined order and to allow the recording device to record this pattern on the recording paper when the indicating device is operated. The pattern may be one for a memo paper or may include time data. After the pattern is recorded on the recording paper, the paper may be cut and discharged from the apparatus by a cutting device. With this apparatus, the recording paper can be promptly used as a memo paper, so that the area which is occupied by the memo paper can be reduced and the telephone set can be easily used.

8 Claims, 6 Drawing Sheets

FACSIMILE COMMUNICATION TERMINAL WITH MEMO PATTERN MEMORY

BACKGROUND OF THE INVENTION

1. Field of the Invention

The present invention relates to a communication terminal apparatus such as a facsimile apparatus and, more particularly, to a communication terminal apparatus which is used together with a telephone set.

2. Related Background Art

Hitherto, in such apparatus, telephone sets and facsimile apparatus have been individually considered and no consideration have been paid to the conjunction of the telephone set and facsimile apparatus. Therefore, in general, the memo paper and the like which are used with telephone sets are also separately provided.

Therefore, for arrangement of the memo paper, the area which is occupied by the memo paper is enlarged. Also, the memo paper must be prepared, and so forth. Thus, there are still many unnecessary complications in the use of a facsimile apparatus with a telephone set.

SUMMARY OF THE INVENTION

It is an object of the present invention to provide a communication terminal apparatus which can solve the foregoing drawbacks.

According to one aspect of the invention, it is an object to provide a communication terminal apparatus which is used together with a telephone set and has means for recording on a recording medium, in which the recording medium can be used as a memo paper.

Figure 1:
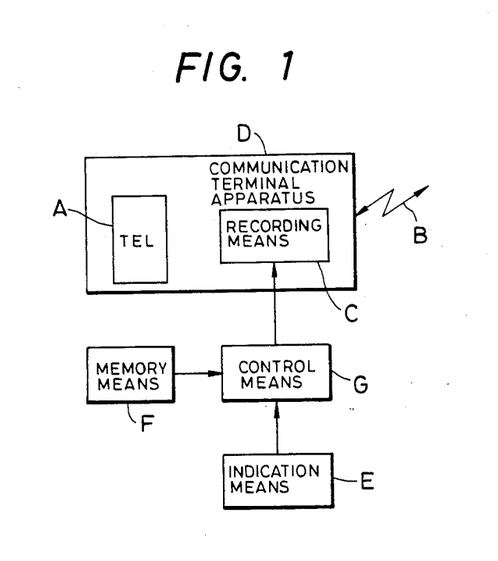
FIG. 1 is a diagram showing a fundamental arrangement of an embodiment.

According to another aspect of the invention, as shown in FIG. 1, in a communication terminal apparatus D which is used together with a telephone set A and has recording means C capable of recording information which is derived through a telephone line B, the apparatus D comprises: indication means E for providing an instruction to allow the recording means C to record; memory means F for storing a predetermined pattern; and control means G for reading out the pattern from the memory means F in accordance with a predetermined order and for allowing the recording means C to record the pattern when the indication means E was operated, wherein when the telephone set A is used, by operating the indication means E, the control means G reads out the predetermined pattern from the memory means F in accordance with the predetermined order, thereby allowing the recording means C to record the pattern.

The above and other objects and features of the present invention will become apparent from the following detailed description and the appended claims with reference to the accompanying drawings

DESCRIPTION OF THE PREFERRED EMBODIMENTS

The present invention will now be described in detail with reference to the drawings.

Figure 2:
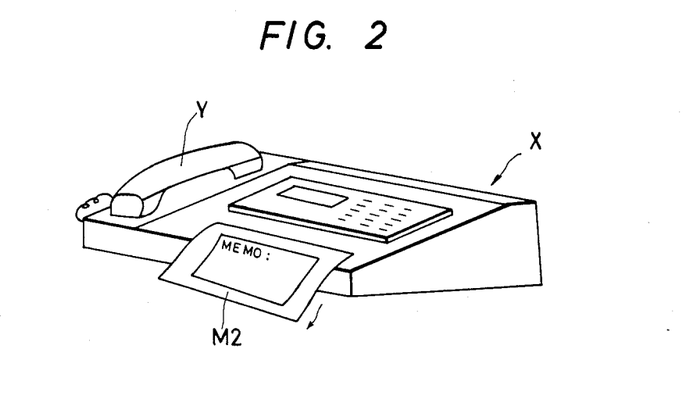
FIG. 2 is an external view of an embodiment of the invention.

FIG. 2 is an external view of an embodiment of the invention. As shown in the diagram, a telephone set Y is integrally coupled with a facsimile apparatus main body X.

Figure 3:
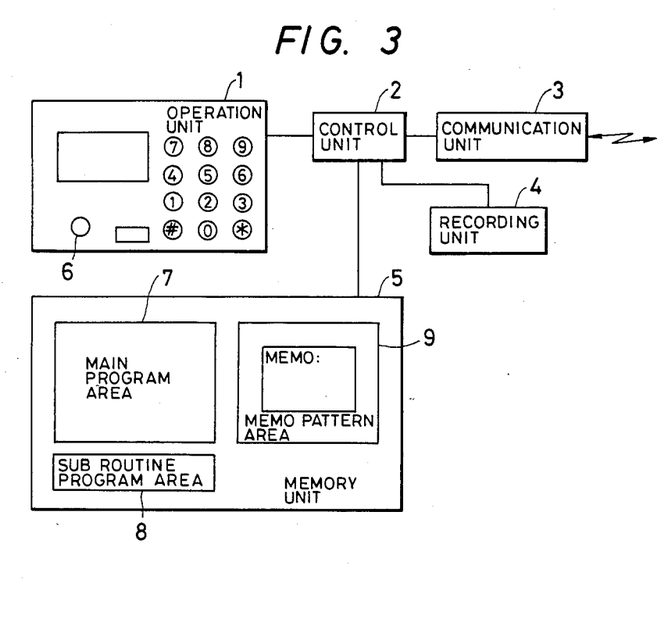
FIG. 3 is a block diagram showing a schematic arrangement of the preferred embodiment of the invention.

FIG. 3 shows a schematic arrangement of the embodiment, in which an operation unit 1 can instruct various kinds of operations. A button 6 to output a memo paper according to the invention is arranged at a predetermined position A control unit 2 as a microprocessor controls the whole apparatus. A communication unit 3 communicates with other apparatuses. A recording unit 4 prints and outputs a reception image and the memo paper and the like according to the invention in a manner as will be explained hereinafter. A program such as shown in, for example, FIG. 5 and the like are stored in a memory unit 5. The memory unit 5 has a main program area 7 in which the main program (memo paper output program) is stored, a subroutine program area 8 in which the subroutine program (rearrangement program of one line) is stored, and a memo pattern area 9 in which memo patterns to be output are stored.

Figure 4A:
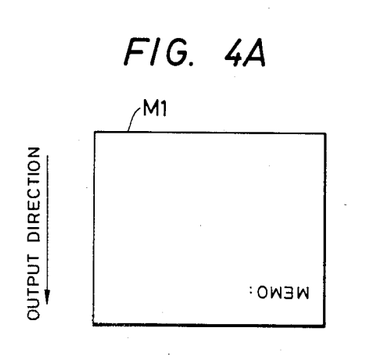
FIGS. 4A and 4B are explanatory diagrams showing output states of a recording paper.
Figure 4B:
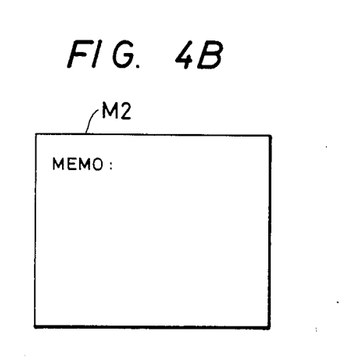

FIGS. 4A and 4B are diagrams showing output states of the memo paper. In the case shown in FIG. 4A, the memo paper $M_1$ is output upside down. However, in the embodiment of the invention, the memo paper $M_2$ is output in the normal state, as shown in FIG. 4B and as will be explained hereinafter.

Figure 5:
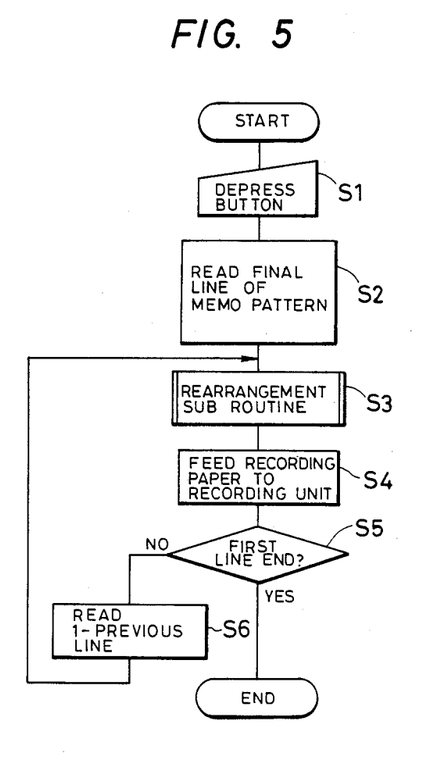
FIGS. 5 and 6 are flowcharts showing an example of the operation of the embodiment of the invention.
Figure 6:
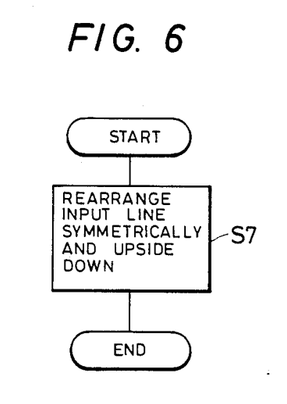
Figure 7:
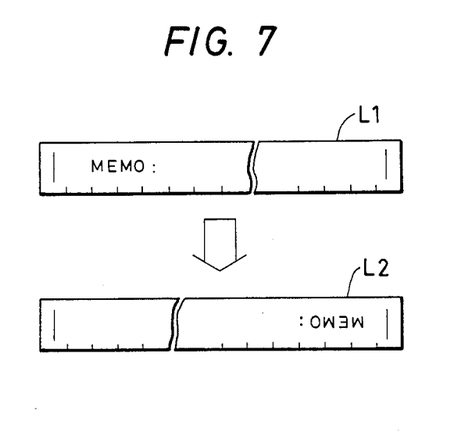
FIG. 7 is an explanatory diagram for explaining a change in image of one line of a memory pattern.

FIG. 5 is a flowchart for the main program which is stored in the main program area 7. FIG. 6 is a flowchart for the subroutine program which is stored in the subroutine program area 8. FIG. 7 is a rearrangement image diagram of one line.

Examples of the operation of the embodiment of the invention will now be described with reference to FIGS. 5 to 7.

First, when the memo paper output button 6 arranged in the operation unit 1 is depressed in step S1, the control unit 2 starts the control according to the main program in the memory unit 5. Namely, the control unit 2 reads the final one line of the memo pattern in the memo pattern area 9 to be output in step S2. Next, the rearrangement subroutine in step S3 will be executed In step S3, the data of one line is stored as an input line $L_1$ into a predetermined memory as shown in, for example, FIG. 7. As shown in step S7 in FIG. 6, the input line data is rearranged symmetrically and upside down so as to become an output line $L_2$ as shown in, e.g., FIG. 7.

In the next step S4, the output line $L_2$ which was turned upside down is recorded on the recording paper by the recording unit 4. Then, a check is made in step S5 to see if the first line of the memo pattern to be output has completely been read or not. In this case, since the reading of the first line is not ended yet, step S6 follows and the one-previous line of the final line is read. In step S3, the foregoing process is again executed and thereafter, the line data is printed on the recording paper in step S4. As the result of that those processes were repeatedly executed, if it is determined that the reading of the data until the first line of the memo pattern has been finished in step S5, the recording paper is output as the memo paper $M_2$ as shown in FIG. 2 or 4A or 4B.

In this manner, according to the embodiment, by adding a slight program without changing each part of the standard construction of the facsimile apparatus, the data of the memo patterns in the memo pattern area 9 is rearranged and the recording paper is output as shown in FIG. 4B. Therefore, the recording paper can be soon used as a memo paper when the telephone set is used, so that the excellent operating performance can be obtained and an additional advantage can be provided.

Figure 9:
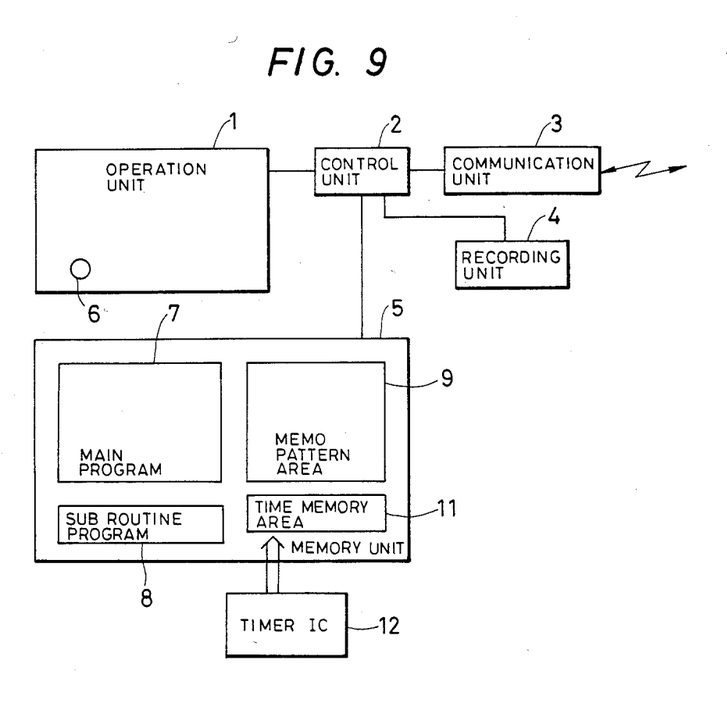
FIGS. 9 and 10 are, respectively, a block diagram for explaining another embodiment of the invention and a corresponding diagram showing a memo pattern.

FIG. 9 shows a control block diagram of another embodiment of the invention.

In FIG. 9, the same parts and components as those shown in FIG. 3 are designated by the same reference numerals. Numeral 11 denotes a time memory area to store the data of the current date and time, and 12 represents a timer IC to generate the data of date and time.

Figure 10:
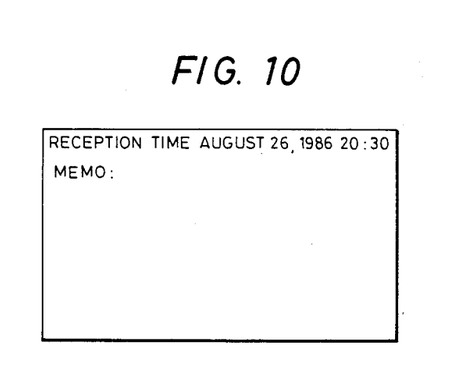

The data in the time memory area 11 is transmitted together with the image data upon transmission in a conventional well-known manner. When the memo paper output button 6 is depressed, a predetermined pattern is recorded on the recording paper in a manner similar to the foregoing embodiment. As shown in FIG. 10, the data of the date and time in the time memory area 11 is recorded on the recording paper. With this constitution, the date and time when the memorandum was written or when the telephone call was received can be clearly known, so that this method is very convenient.

Figure 11:
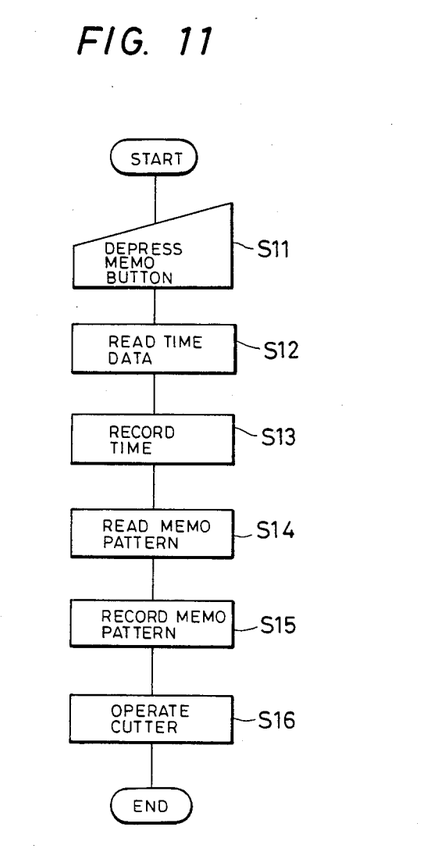
FIG. 11 is a flowchart showing the operation of the embodiment of FIGS. 9 and 10.

FIG. 11 shows a control flowchart of the control unit 2 in the second embodiment.

In FIG. 11, when the memo button 6 is depressed in step S11, the data indicative of the date and time is read out of the time memory area 11 in step S12 and recorded in step S13. A desired memo pattern is read out of the memo pattern area 9 in step S14 and recorded in step S15. In steps S12 to S15, the recording paper is sequentially fed. After the memo paper was completed, the cutter is made operative in step S16 to cut the memo paper, so that the paper is discharged. In this manner, the memo paper as shown in FIG. 10 is derived. The rearranging operation as shown in FIGS. 5 and 6 may be also performed.

Figure 8:
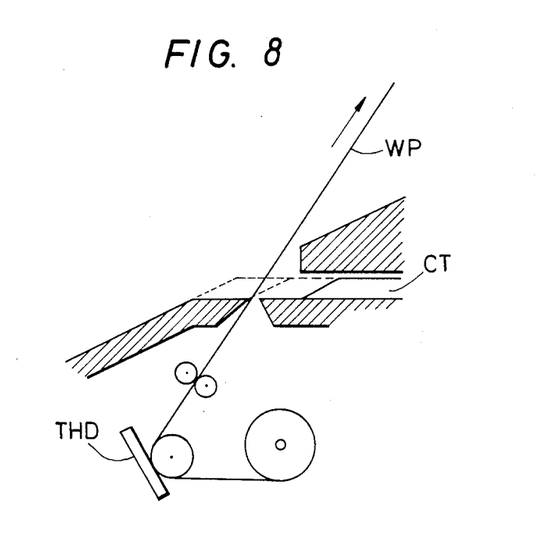
FIG. 8 is a conceptional diagram illustrating a case in which the objects of the invention are attained by a mechanical system.

In the above embodiments, the operating performance has been improved by the software. However, the invention is not limited to this method but may be realized mechanically, for example, as shown in FIG. 8. Namely, a thermal recording paper WP on which data has been printed by a thermal head THD is once fed upwardly and the movable blade of a cutter CT is moved as shown by broken lines, thereby allowing the cut recording paper WP to be dropped down from the upper portion With this construction the objects of the invention can be attained without rearranging the memory pattern as described in the foregoing embodiments. In this case, however, when the recording paper WP is printed and discharged out of the main body, it is sufficient to form a paper guard on both sides so that the upper portion of the printed recording paper WP doesn't fall on the front side.

As described above, according to the invention, in the communication terminal apparatus such as a facsimile apparatus which is used together with a telephone set, when the indication means is operated to use the telephone set, the recording paper on which a predetermined pattern read out of the memory means has been recorded is immediately derived as a form which can be used as a memo paper. Therefore, the arrangement area which is occupied by the memo paper can be remarkably reduced and at the same time, the telephone set can be fairly easily used.

The present invention is not limited to the foregoing embodiments but many modifications and variations are possible within the spirit and scope of the appended claims of the invention.

What is claimed is:

1. A communication terminal apparatus which is adapted to be used in combination with a telephone set; said terminal apparatus comprising:
    recording means for recording information which is obtained through a line on a recording medium;
    memory means for storing a predetermined pattern;
    a manual switch for manually instructing that the recording medium used in said recording means is used for a memorandum and for manually instructing said terminal apparatus to cause said recording means to record on the recording medium said predetermined pattern stored in said memory means;
    discharge means for discharging the recording medium, in response to instruction by said manual switch; and
    control means for controlling such that the information obtained through the line is recorded on the recording medium by said recording means during a reception operation of said terminal apparatus, said predetermined pattern is read out from said memory means in a predetermined order in response to the instruction from said manual switch to be recorded on the recording medium by said recording means when an operation other than recording of information obtained through the line is being executed, and the recording medium on which said pattern is recorded is discharged by said discharge means.

2. A communication terminal apparatus according to claim 1, wherein said pattern is a pattern for a memo paper.

3. A communication terminal apparatus according to claim 1, wherein said pattern includes time data.

4. A communication terminal apparatus according to claim 2, wherein said pattern includes time data.

5. A communication terminal apparatus according to claim 1, further having cutting means for cutting the recording medium after said pattern was recorded thereon.

6. A data communication apparatus comprising:
    recording means for recording data which is obtained through a communication line on a recording paper;
    generating means for generating a pattern signal indicative of a predetermined pattern for a memorandum paper;
    a manual switch for manually instructing that the recording paper is to be used as memorandum paper and for manually instructing said recording means to record said pattern from said generating means;

discharge means for discharging the recording paper, in response to instruction by said manual switch; and control means for controlling such that reception data obtained from the communication line is recorded on the recording paper by said recording means during a reception operation of said communication apparatus, said pattern is recorded on the recording paper by said recording means in response to the instruction from said manual switch when an operation other than recording of the information obtained through the line is being executed, and said recording paper on which said pattern is discharged by said discharge means.

7. A data communication apparatus according to claim 6, wherein said pattern includes time data.

8. A data communication apparatus according to claim 6, further having cutting means for cutting the recording paper after said pattern was recorded thereon.

* * * * *

UNITED STATES PATENT AND TRADEMARK OFFICE
CERTIFICATE OF CORRECTION

PATENT NO. : 4,788,709

DATED : November 29, 1988

INVENTOR(S) : KOICHI MATSUMOTO

It is certified that error appears in the above-identified patent and that said Letters Patent is hereby corrected as shown below:

COLUMN 1

Line 14 "have" should read --has--.
    Line 57, Insert space before and after "BRIEF DESCRIPTION OF THE DRAWINGS".

COLUMN 2

Line 24, "position" should read --position.--.

COLUMN 3

Line 35, "memorandom" should read --memorandum--.
    Line 63, "portion" should read --portion.-- and "construction" should read --construction,--.

COLUMN 4

Line 1, "do-" should read --does not--.
    Line 2, "esn't" should be deleted.
    Line 12, "reduced" should read --reduced,--.

UNITED STATES PATENT AND TRADEMARK OFFICE
CERTIFICATE OF CORRECTION

PATENT NO. : 4,788,709
DATED : November 29, 1988
INVENTOR(S) : KOICHI MATSUMOTO

It is certified that error appears in the above-identified patent and that said Letters Patent is hereby corrected as shown below:

COLUMN 6

Line 4, "is discharged" should read
--is recorded is discharged--.

Signed and Sealed this

Sixth Day of February, 1990

*Attest:*

JEFFREY M. SAMUELS

*Attesting Officer*   *Acting Commissioner of Patents and Trademarks*